(12) United States Patent
Venugopal et al.

(10) Patent No.: US 10,973,044 B1
(45) Date of Patent: Apr. 6, 2021

(54) DEFAULT SPATIAL RELATION FOR SRS/PUCCH

(71) Applicant: QUALCOMM Incorporated, San Diego, CA (US)

(72) Inventors: Kiran Venugopal, Raritan, NJ (US); Yan Zhou, San Diego, CA (US); Tianyang Bai, Bridgewater, NJ (US); Jung Ho Ryu, Fort Lee, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/805,674

(22) Filed: Feb. 28, 2020

Related U.S. Application Data

(60) Provisional application No. 62/910,342, filed on Oct. 3, 2019.

(51) Int. Cl.
| | | |
|---|---|---|
| *H04W 72/12* | (2009.01) |
| *H04W 72/04* | (2009.01) |
| *H04W 80/02* | (2009.01) |
| *H04L 25/02* | (2006.01) |
| *H04L 5/00* | (2006.01) |

(52) U.S. Cl.
CPC ....... *H04W 72/1273* (2013.01); *H04L 5/0051* (2013.01); *H04L 25/0226* (2013.01); *H04W 72/042* (2013.01); *H04W 72/046* (2013.01); *H04W 72/0413* (2013.01); *H04W 80/02* (2013.01)

(58) Field of Classification Search
CPC ......... H04W 72/1273; H04W 72/0413; H04W 72/042; H04W 72/046; H04W 80/02; H04L 5/0051; H04L 25/0226
See application file for complete search history.

(56) References Cited

U.S. PATENT DOCUMENTS

| | | | | |
|---|---|---|---|---|
| 2018/0302889 | A1* | 10/2018 | Guo | H04L 5/0053 |
| 2018/0343653 | A1* | 11/2018 | Guo | H04L 5/0053 |
| 2019/0053072 | A1* | 2/2019 | Kundargi | H04B 17/21 |
| 2019/0069285 | A1* | 2/2019 | Chandrasekhar | H04B 7/088 |
| 2019/0081740 | A1* | 3/2019 | Kaikkonen | H04W 72/0446 |
| 2019/0082335 | A1* | 3/2019 | Yu | H04W 24/04 |
| 2019/0082456 | A1* | 3/2019 | Kim | H04L 1/1854 |
| 2019/0103908 | A1* | 4/2019 | Yu | H04B 7/0851 |
| 2019/0141693 | A1* | 5/2019 | Guo | H04W 72/046 |

(Continued)

OTHER PUBLICATIONS

International Search Report and Written Opinion—PCT/US2020/053861—ISA/EPO—dated Jan. 14, 2021.

(Continued)

*Primary Examiner* — Dung B Huynh
(74) *Attorney, Agent, or Firm* — Procopio, Cory, Hargreaves & Savitch LLP/Qualcomm

(57) ABSTRACT

The apparatus determines, for a CC, an active TCI state of at least one of a CORESET of a PDCCH when the CORESET is configured on the CC or a PDSCH. In addition, the apparatus determines, based on the determined active TCI state, a default beam on the CC for transmitting at least one of a PUCCH or SRS. Further, the apparatus transmits at least one of the PUCCH or the SRS through the determined default beam on the CC.

28 Claims, 7 Drawing Sheets

(56) References Cited

U.S. PATENT DOCUMENTS

| | | | | |
|---|---|---|---|---|
| 2019/0150133 A1* | 5/2019 | Li | | H04W 72/046 |
| | | | | 375/224 |
| 2019/0181941 A1* | 6/2019 | Kim | | H04B 7/0695 |
| 2019/0190582 A1* | 6/2019 | Guo | | H04B 7/088 |
| 2019/0207737 A1* | 7/2019 | Babaei | | H04L 27/2607 |
| 2019/0215701 A1* | 7/2019 | Honglei | | H04B 7/0617 |
| 2019/0215897 A1* | 7/2019 | Babaei | | H04W 76/28 |
| 2019/0222357 A1* | 7/2019 | Huang | | H04L 5/0053 |
| 2019/0229792 A1* | 7/2019 | John Wilson | | H04W 72/0446 |
| 2019/0230545 A1* | 7/2019 | Liou | | H04W 24/10 |
| 2019/0230730 A1* | 7/2019 | Wang | | H04W 76/19 |
| 2019/0239093 A1* | 8/2019 | Zhang | | H04L 5/0091 |
| 2019/0239212 A1* | 8/2019 | Wang | | H04L 5/0053 |
| 2019/0239245 A1* | 8/2019 | Davydov | | H04W 16/28 |
| 2019/0253220 A1* | 8/2019 | Kim | | H04L 5/0053 |
| 2019/0253986 A1* | 8/2019 | Jeon | | H04W 76/19 |
| 2019/0254045 A1* | 8/2019 | Sadiq | | H04B 7/0617 |
| 2019/0261195 A1* | 8/2019 | Cheng | | H04W 24/10 |
| 2019/0261281 A1* | 8/2019 | Jung | | H04W 52/50 |
| 2019/0261338 A1* | 8/2019 | Akkarakaran | | H04W 72/0413 |
| 2019/0268053 A1* | 8/2019 | John Wilson | | H04B 7/0634 |
| 2019/0268061 A1* | 8/2019 | Li | | H04B 7/0626 |
| 2019/0268893 A1* | 8/2019 | Tsai | | H04W 74/0833 |
| 2019/0268961 A1* | 8/2019 | Tsai | | H04W 74/0833 |
| 2019/0273637 A1* | 9/2019 | Zhang | | H04B 5/0031 |
| 2019/0281587 A1* | 9/2019 | Zhang | | H04W 72/042 |
| 2019/0289588 A1* | 9/2019 | Akkarakaran | | H04B 7/088 |
| 2019/0296805 A1* | 9/2019 | Son | | H04W 76/27 |
| 2019/0297547 A1* | 9/2019 | Tsai | | H04W 24/10 |
| 2019/0297603 A1* | 9/2019 | Guo | | H04L 5/0051 |
| 2019/0297640 A1* | 9/2019 | Liou | | H04W 48/12 |
| 2019/0306850 A1* | 10/2019 | Zhang | | H04B 7/0639 |
| 2019/0306909 A1* | 10/2019 | Zhou | | H04B 7/08 |
| 2019/0306924 A1* | 10/2019 | Zhang | | H04W 72/046 |
| 2019/0312698 A1* | 10/2019 | Akkarakaran | | H04B 7/0695 |
| 2019/0313429 A1* | 10/2019 | Cheng | | H04L 5/0053 |
| 2019/0320469 A1* | 10/2019 | Huang | | H04L 5/0053 |
| 2019/0349060 A1* | 11/2019 | Liao | | H04B 7/0695 |
| 2019/0349061 A1* | 11/2019 | Cirik | | H04W 80/02 |
| 2019/0349964 A1* | 11/2019 | Liou | | H04L 5/0094 |
| 2019/0373450 A1* | 12/2019 | Zhou | | H04W 74/0833 |
| 2019/0379506 A1* | 12/2019 | Cheng | | H04L 5/0051 |
| 2020/0014444 A1* | 1/2020 | Mueck | | H04B 7/0623 |
| 2020/0044797 A1* | 2/2020 | Guo | | H04L 5/005 |
| 2020/0045569 A1* | 2/2020 | Seo | | H04W 72/042 |
| 2020/0052844 A1* | 2/2020 | Yu | | H04L 5/0023 |
| 2020/0059398 A1* | 2/2020 | Pan | | H04L 41/0654 |
| 2020/0068548 A1* | 2/2020 | Guan | | H04L 5/00 |
| 2020/0099492 A1* | 3/2020 | Shi | | H04W 72/042 |
| 2020/0100154 A1* | 3/2020 | Cirik | | H04W 36/06 |
| 2020/0100311 A1* | 3/2020 | Cirik | | H04W 72/042 |
| 2020/0120584 A1* | 4/2020 | Yi | | H04W 72/042 |
| 2020/0137821 A1* | 4/2020 | Cirik | | H04W 76/19 |
| 2020/0178239 A1* | 6/2020 | Yi | | H04W 76/27 |
| 2020/0195334 A1* | 6/2020 | Zhou | | H04L 5/005 |

OTHER PUBLICATIONS

NEC: "Delay Requirements for Active TCI State Switch", 3GPP Draft, R4-1903623, 3GPP TSG-RAN WG4 Meeting #90-Bis, 3rd Generation Partnership Project (3GPP), Mobile Competence Centre, 650, Route Des Lucioles, F-06921 Sophia-Antipolis Cedex, France, vol, RAN WG4, No. Xi' an, China, Apr. 8, 2019-Apr. 12, 2019, Apr. 1, 2019 (Apr. 1, 2019), XP051714029, 4 Pages, Retrieved from the Internet: URL: http://www.3gpp.org/ftp/tsg%5Fran/WG4%5FRadio/TSGR4%5F90Bis/Docs/R4%2D1903623%2Ezip [retrieved on Apr. 1, 2019] Section 2.6.4.

Qualcomm Incorporated: "Enhancements on Multi-Beam Operation", 3GPP Draft, R1-1909273, 3GPP TSG-RAN WGl Meeting #98, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 26, 2019-Aug. 30, 2019, Aug. 17, 2019 (Aug. 17, 2019), XP051765878, 19 Pages, Retrieved from the Internet: URL: http://www.3gpp.org/ftp/tsg_ran/WG1_RL1/TSGR1_98/Docs/R1-1909273.zip [retrieved Aug. 17, 2019] Section 7.4.

* cited by examiner

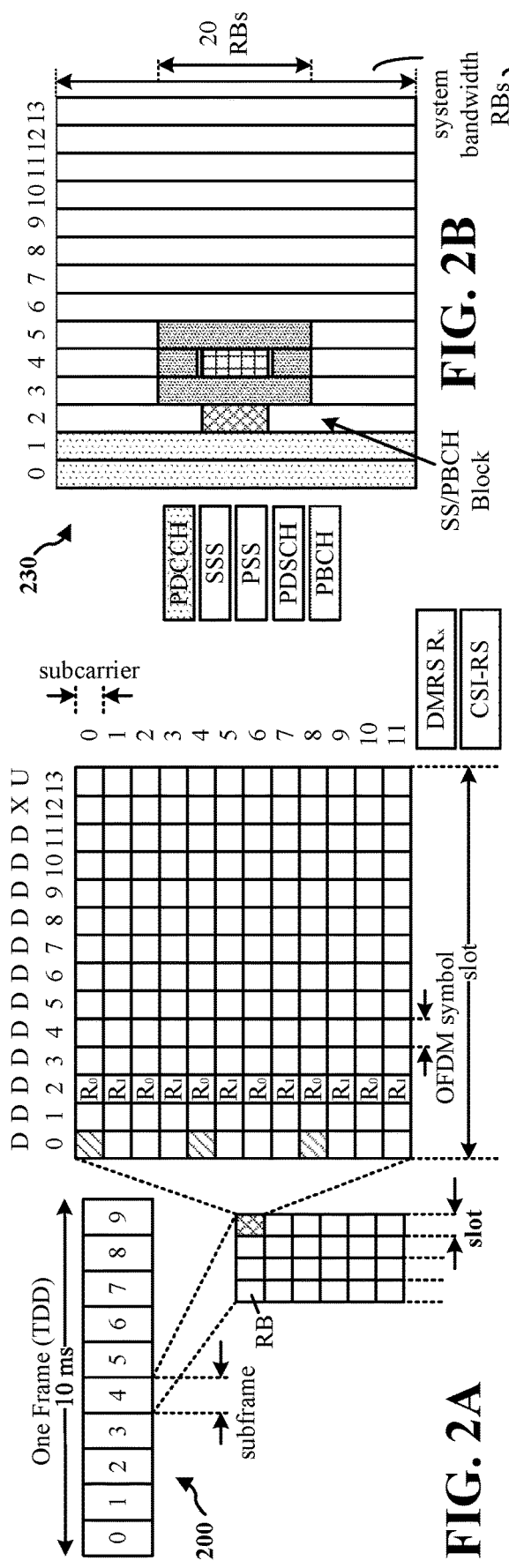
FIG. 2A
FIG. 2B
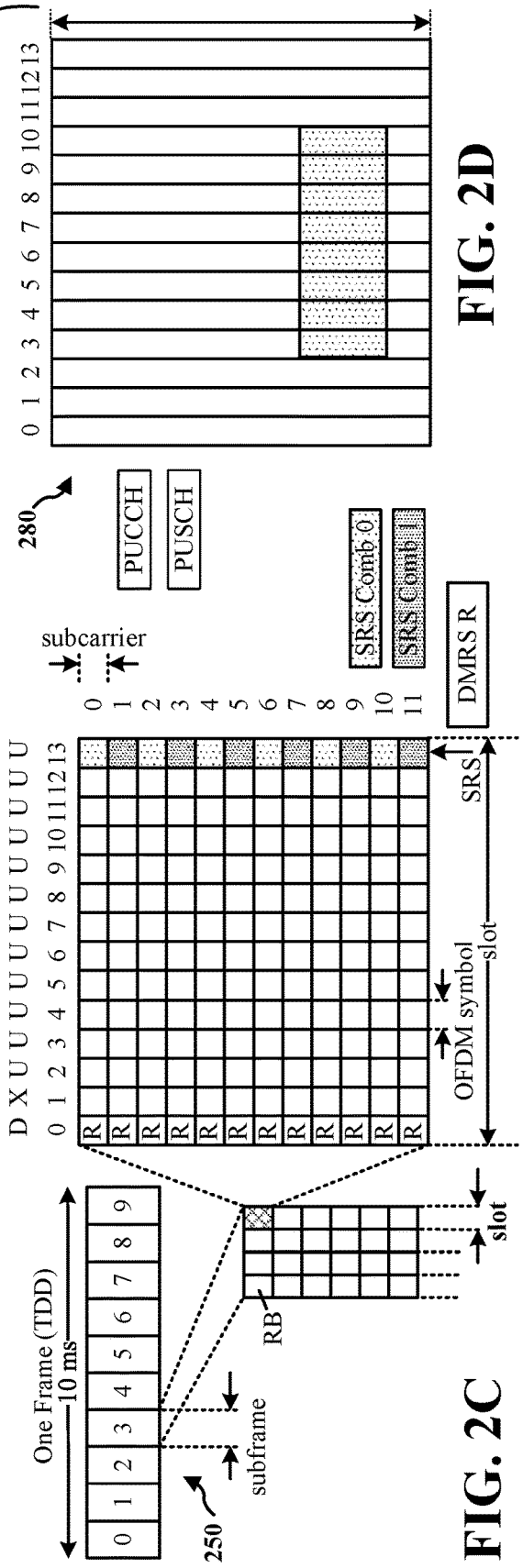
FIG. 2C
FIG. 2D

DEFAULT SPATIAL RELATION FOR SRS/PUCCH

CROSS REFERENCE TO RELATED APPLICATION(S)

This application claims the benefit of U.S. Provisional Application Ser. No. 62/910,342, entitled "DEFAULT SPATIAL RELATION FOR SRS/PUCCH" and filed on Oct. 3, 2019, which is expressly incorporated by reference herein in its entirety.

BACKGROUND

Technical Field

The present disclosure relates generally to communication systems, and more particularly, to a default spatial relation for sounding reference signals (SRS) and/or a physical uplink control channel (PUCCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A default spatial relation in a component carrier (CC) for SRS/PUCCH transmissions is provided when a spatial relation is not explicitly configured for the SRS/PUCCH transmissions. Specifically, methods/apparatuses for determining an active transmission configuration indicator (TCI) state that is used for determining a default beam for transmitting SRS and/or PUCCH are provided.

In an aspect of the disclosure, a method, a computer-readable medium, and an apparatus at a user equipment (UE) are provided. The apparatus determines, for a CC, an active TCI state of at least one of a control resource set (CORESET) of a physical downlink control channel (PDCCH) when the CORESET is configured on the CC or a physical downlink shared channel (PDSCH). Subsequently, the apparatus determines, based on the determined active TCI state, a default beam on the CC for transmitting at least one of a PUCCH or SRS. The apparatus subsequently transmits at least one of the PUCCH or the SRS through the determined default beam on the CC.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
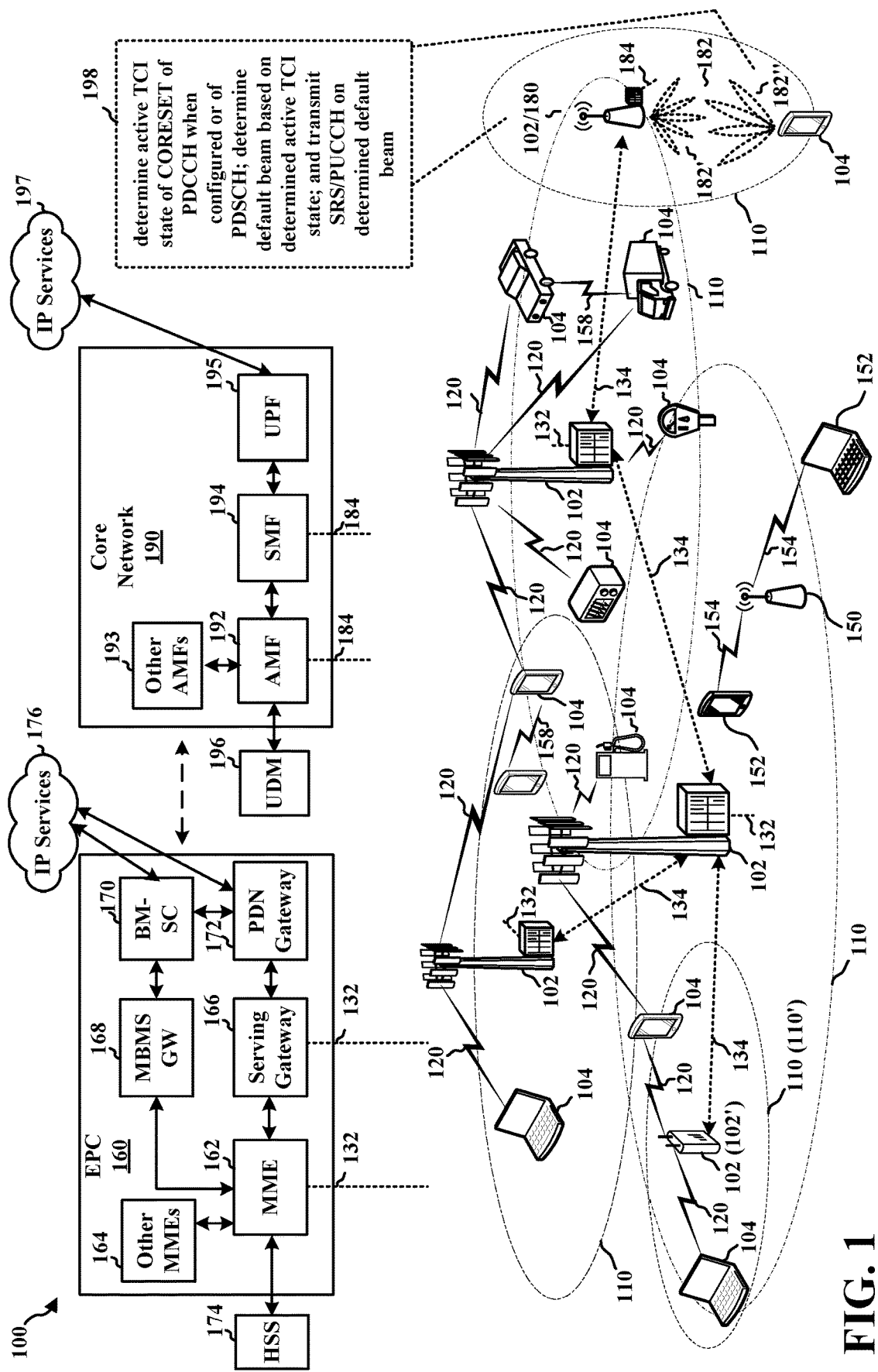
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine, for a CC, an active TCI state of at least one of a CORESET of a PDCCH when the CORESET is configured on the CC or a PDSCH. The UE 104 subsequently determines, based on the determined active TCI state, a default beam on the CC for transmitting at least one of a PUCCH or SRS. The UE 104 subsequently transmits at least one of the PUCCH or the SRS through the determined default beam on the CC (198).

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. Each bandwidth part (BWP) of the system bandwidth may have its own slot configuration and numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu *15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
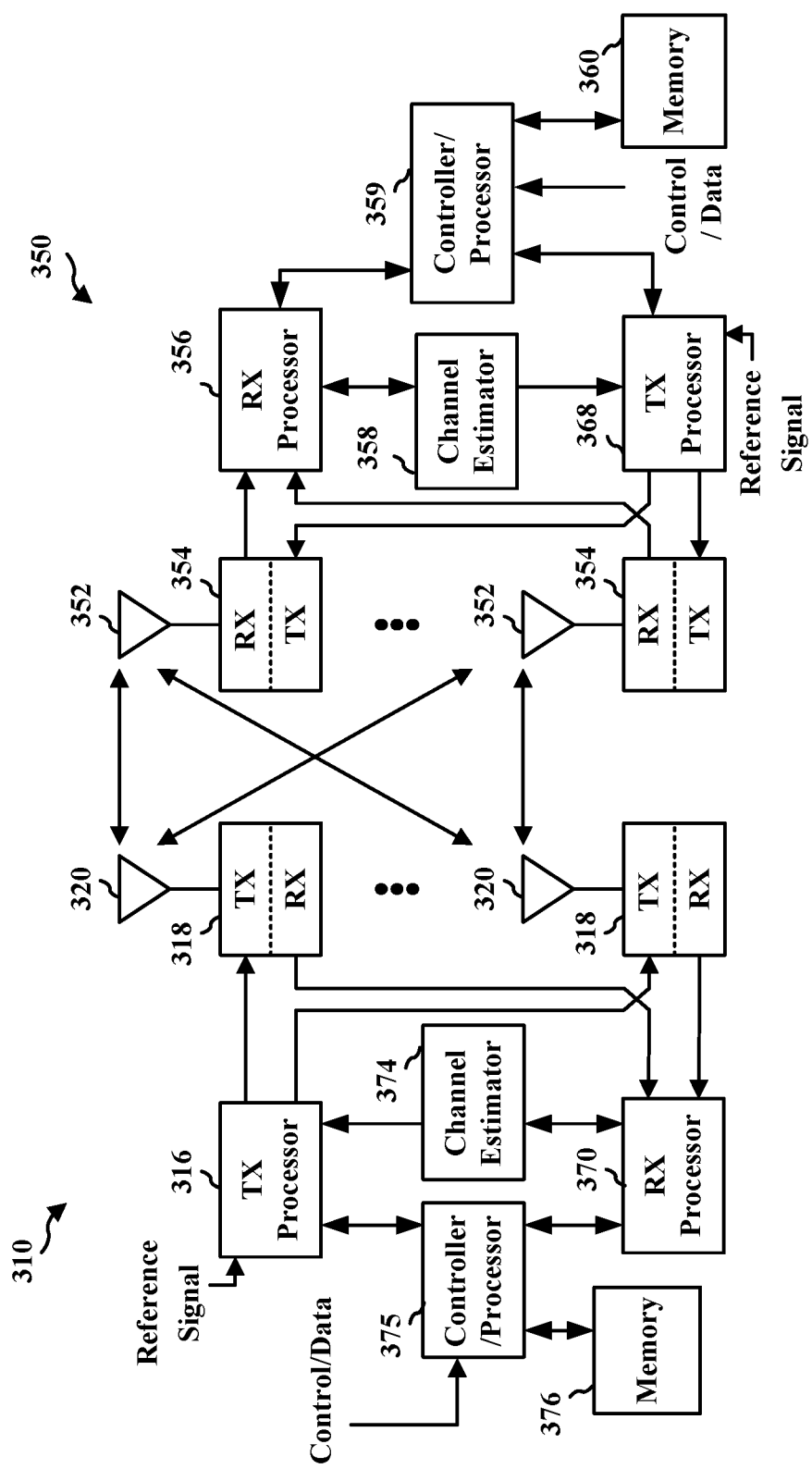
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC)

layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. At least one of the TX processor 368, the RX processor 356, and the controller/processor 359 may be configured to perform aspects in connection with 198 of FIG. 1.

The TCI is used to indicate quasi-co located (QCL) relations for downlink transmissions. Two antenna ports are said to be QCL if properties of the channel over which a symbol on one antenna port is conveyed can be inferred from the channel over which a symbol on the other antenna port is conveyed. A set of two QCL antenna ports may have a common set of QCL relations (referred to as the same spatial filter), such as one or more of Doppler shift, Doppler spread, average delay, delay spread, or a spatial Rx parameter. There are four different types of QCL, including QCL-TypeA (Dopper Shift, Doppler Spread, average delay, delay spread), QCL-TypeB (Dopper Shift, Doppler Spread), QCL-TypeC (average delay, Doppler shift), and QCL-TypeD (spatial Rx parameter). A UE may utilize the QCL relations of a pair of beams to infer information from one beam to another. A UE may be configured with up to 64 candidate TCI states, where a first subset may be associated with a CORESET of the PDCCH and a second subset may be associated with the PDSCH. When a default beam for SRS/PUCCH is not configured, a UE may determine a spatial relation (default beam) (e.g., QCL-TypeD) for transmitting the SRS/PUCCH based on TCI state information. At least for a UE that supports beam correspondence, if spatial relation information is not configured for a dedicated SRS/PUCCH transmission, the UE may determine a default spatial relation for the dedicated SRS/PUCCH transmission. That is, specifically, if spatial relation information is not configured for a dedicated SRS/PUCCH transmission, the UE may determine a default beam for transmitting the SRS/PUCCH.

The spatial relation information indicating a default beam for transmitting SRS and/or a default beam for transmitting PUCCH may be optionally configured through RRC signaling (e.g., through parameter PUCCH-SpatialRelationInfo). However, to save overhead, the spatial relation information for the SRS/PUCCH may not be RRC configured. When the default spatial relation for SRS/PUCCH is not configured, the UE may determine the default spatial relation.

In a first configuration, the UE may determine the default spatial relation for SRS/PUCCH based on the default TCI state or QCL assumption of the PDSCH (e.g., the lowest CORESET ID/index of the most recent slot). Specifically, assuming that there is beam correspondence (same channel reciprocity and the same beam assumption/direction can be applied for the downlink reception and uplink transmission), the same beam used for receiving the PDSCH may be used as a default beam for transmitting the SRS/PUCCH. In a second configuration, the UE may determine the default spatial relation for SRS/PUCCH based on an active TCI state of a CORESET for a PDCCH. Specifically, the UE may determine the default spatial relation for SRS/PUCCH based on one of the active beams used for receiving the PDCCH. In a third configuration, the UE may determine the default spatial relation for SRS/PUCCH based on a TCI state of a scheduling PDCCH for an aperiodic SRS (A-SRS)/PUCCH, and a default TCI state or QCL assumption of the PDSCH for other than the A-SRS/PUCCH. In a fourth configuration, the UE may determine the default spatial relation for SRS/PUCCH based on the QCL assumption of the CORESET #0, which is configured in the MIB. In a fifth configuration, the UE may determine the default spatial relation for SRS/PUCCH based on a pathloss reference signal (RS) (e.g., pathlossReferenceRSs, SRS-PathlossReferenceRS).

In a sixth configuration, which active TCI state is used by the UE on a CC for determining the default spatial relation for SRS/PUCCH may be based on whether a CORESET for a PDCCH is configured for the CC. Specifically, in the sixth configuration, if a CORESET for a PDCCH is configured on the CC, the default spatial relation for SRS/PUCCH is one of the active TCI states of the CORESET (e.g., CORESET with the lowest index in the active DL BWP). However, if a CORESET is not configured for the PDCCH on the CC, the default spatial relation for SRS/PUCCH may be one of the active TCI states of the PDSCH. In one example, the active TCI state of the PDSCH that is used by the UE for the default spatial relation for the SRS/PUCCH may be the TCI state with the lowest TCI state ID (which may be 7 bits, varying between 0 and 127). Alternatively, the active TCI state of the PDSCH that is used by the UE for the default spatial relation for the SRS/PUCCH may be indicated in a medium access control (MAC) control element (CE) within a MAC header of a received PDSCH.

In the sixth configuration, when the CC is a primary cell for which the UE determines the default spatial relation for the PUCCH on the primary cell, the UE may determine the default spatial relation based on a CORESET of a PDCCH on the primary CC. The CORESET may have the lowest index, as discussed above. Specifically, if the UE is not provided with pathloss reference RSs (e.g., pathlossReferenceRSs) or PUCCH spatial relation information (e.g., PUCCH-SpatialRelationInfo), and is enabled to determine the default beam for the PUCCH (e.g., enableDefaultBeamPlForPUCCH), the UE may determine a RS resource index providing a RS resource with QCL-TypeD in the TCI state or the QCL assumption of a CORESET with the lowest index in the active DL BWP of the primary cell. However, when the CC is a secondary cell for which the UE determines the default spatial relation for the PUCCH on the secondary cell, the UE may determine that the default spatial relation for the PUCCH is one of the active TCI states of a CORESET of the PDCCH on the secondary cell when the CORESET for the PDCCH is configured on the secondary cell, and may determine that the default spatial relation for the PUCCH is one of the active TCI states of the PDSCH when the CORESET is not configured for the PDCCH on the secondary cell. Specifically, if the UE is not provided with pathloss reference RSs (e.g., pathlossReferenceRSs) or PUCCH spatial relation information (e.g., PUCCH-SpatialRelationInfo), and is enabled to determine the default beam for the PUCCH (e.g., enableDefaultBeamPlForPUCCH), the UE may determine a RS resource index providing a RS resource with QCL-TypeD in (1) the TCI state or the QCL assumption of a CORESET with the lowest index, if CORESETs are provided in the active DL BWP, and (2) the active PDSCH TCI state with the lowest ID, if CORESETs are not provided in the active DL BWP.

Further, in the sixth configuration, when the UE determines the default spatial relation for the SRS, the UE may determine that the default spatial relation for the SRS is one of the active TCI states of a CORESET of the PDCCH when the CORESET for the PDCCH is configured, and may determine that the default spatial relation for the PUCCH is one of the active TCI states of the PDSCH when the CORESET is not configured for the PDCCH. Specifically, if the UE is not provided with pathloss reference RSs (e.g., pathlossReferenceRSs or an SRS pathloss reference RS (SRS-PathlossReferenceRS)) or spatial relation information, and is enabled to determine the default beam for the SRS (e.g., enableDefaultBeamPlForSRS), the UE may determine a RS resource index providing a RS resource with QCL-TypeD in (1) the TCI state or the QCL assumption of a CORESET with the lowest index, if CORESETs are provided in the active DL BWP, and (2) the active PDSCH TCI state with the lowest ID, if CORESETs are not provided in the active DL BWP.

In a seventh configuration, the UE may determine the default spatial relation for SRS/PUCCH based on one of the active TCI states of the PDSCH. In one example, the active TCI state of the PDSCH that is used by the UE for the default spatial relation for the SRS/PUCCH may be the TCI state with the lowest TCI state ID. Alternatively, the active TCI state of the PDSCH that is used by the UE for the default spatial relation for the SRS/PUCCH may be indicated in a MAC-CE within a MAC header of a received PDSCH.

When the UE supports two active TCI states for the PDCCH where one of them is for the PDSCH, the default spatial relation for SRS/PUCCH may follow the default spatial relation for the PDSCH. In such a configuration, there are two different options. In a first option, the UE may follow the active TCI state of one CORESET (e.g., lowest CORESET ID/index with TCI state). Specifically, the UE may determine the active TCI state associated with both the PDCCH and the PDSCH based on an active TCI state for a CORESET of the PDCCH. In a second option, the active TCI state associated with both the PDCCH and the PDSCH (among the two active TCI states for the PDCCH) may be indicated in a MAC-CE.

In the sixth and seventh configurations, the UE may determine an active TCI state associated with a CORESET of a PDCCH, if configured, or associated with a PDSCH, and based on the active TCI state, may determine a default spatial relation/default beam for transmitting SRS and/or PUCCH. In one configuration, the SRS/PUCCH are transmitted on the same default beam. In another configuration, the SRS/PUCCH are transmitted on different default beams. In such a configuration, the UE may determine separate active TCI states for the SRS and PUCCH. That is, for determining a default spatial relation/beam for transmitting SRS, the UE may determine a first active TCI state based on a CORESET of a PDCCH, if configured, or a PDSCH, and for determining a default spatial relation/beam for transmitting the PUCCH, may determine a second active TCI state based on the CORESET of the PDCCH, if configured, or the PDSCH.

After determining an active TCI state, the UE determines the default spatial relation/beam associated with the active TCI state, and then subsequently, transmits SRS and/or uplink control information (UCI) on the PUCCH on the default beam determined based on the determined active TCI state.

Figure 4:
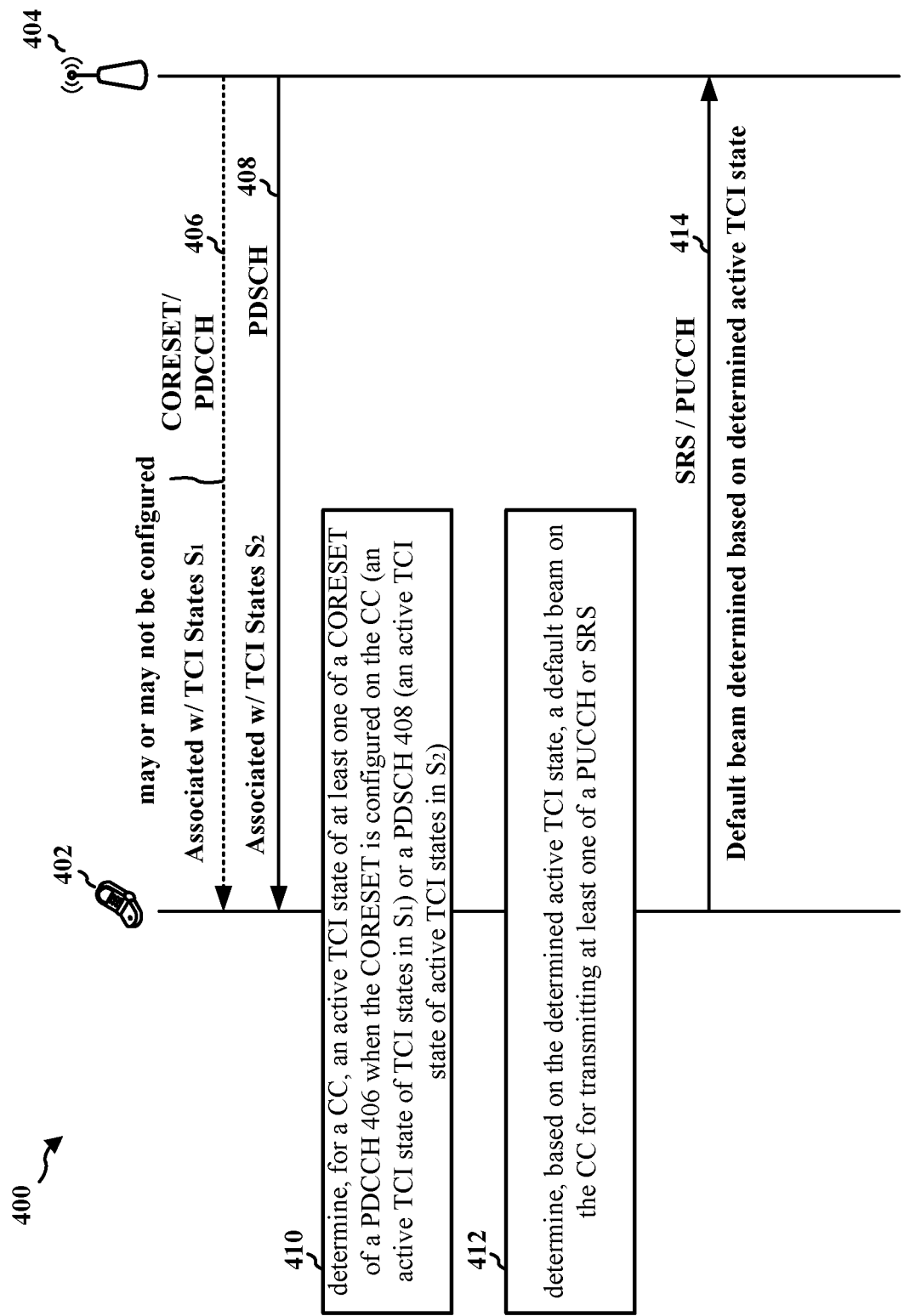
FIG. 4 is a call flow diagram illustrating how a UE may determine a default spatial relation/beam for transmitting SRS/PUCCH.

FIG. 4 is a call flow diagram 400 illustrating how a UE may determine a default spatial relation/beam for transmitting SRS/PUCCH. As illustrated in FIG. 4, a UE 402 may be configured with a PDCCH 406, or more specifically, with a CORESET on the PDCCH 406. The CORESET/PDCCH 406 is associated with a set of active TCI states $S_1$. The active TCI states $S_1$ provide information indicating beams that are QCL with the PDCCH 406. The UE 402 is configured with a PDSCH 408. The PDSCH 408 is associated with a set of active TCI states $S_2$. The active TCI states $S_2$ provide information indicating beams that are QCL with the PDSCH 408. The PDSCH 408 is on a particular CC, and the CORESET/PDCCH 406 is also on the CC if configured. At 410, the UE 402 determines, for a CC, an active TCI state of at least one of a CORESET of a PDCCH 406 when the CORESET is configured on the CC or a PDSCH 408. The active TCI state is one TCI state of $S_1$ or $S_2$ (note that some TCI states may be common to both $S_1$ and $S_2$). At 412, the UE 402 determines, based on the determined active TCI state, a default beam on the CC for transmitting at least one of a PUCCH or SRS. At 414, the UE 402 transmits to a base station 404 at least one of the PUCCH or the SRS through the determined default beam on the CC. The SRS and the PUCCH may be transmitted on the same default beam or on different beams. When the SRS/PUCCH are transmitted on the same default beam, the determined active TCI state is used to determine the default beam for both the SRS and the PUCCH. However, when the SRS and the PUCCH are transmitted on different default beams, different active TCI states may be used to determine the corresponding default beams for the SRS and the PUCCH.

Before performing 410, the UE 402 may determine whether the CORESET for the PDCCH is configured on the CC. When the CORESET is configured on the CC, at 410, the UE 402 may determine an active TCI state of the CORESET, and based on the determined active TCI state, at 412, the UE 402 may determine a default beam for transmitting the SRS/PUCCH. When the CORESET is not configured on the CC, at 410, the UE 402 may determine an active TCI state of the PDSCH, and based on the determined active TCI state, at 412, the UE 402 may determine a default beam for transmitting the SRS/PUCCH.

Different mechanisms may be used for determining which active TCI state to select of the associated active TCI states $S_1$ of the CORESET, or which active TCI state to select of the associated active TCI states $S_2$ of the PDSCH. In one configuration, the UE 402 may select the TCI state of $S_1/S_2$ with the lowest TCI state ID. In another configuration, the UE 402 may receive from the base station 404 a MAC-CE that specifies the active TCI state through which the UE 402 determines the default beam for the SRS/PUCCH.

Alternatively at 410, the UE 402 may determine that the active TCI state is one active TCI state of active TCI states $S_2$ of the PDSCH, and at 412, the UE 402 may determine the default beam for the SRS/PUCCH based on the determined active TCI state of the PDSCH. As discussed above, different mechanisms may be used for determining which active TCI state to select of the associated active TCI states $S_2$ of the PDSCH. In one configuration, the UE 402 may select the TCI state of $S_2$ with the lowest TCI state ID. In another configuration, the UE 402 may receive from the base station 404 a MAC-CE that specifies the active TCI state of the PDSCH through which the UE 402 determines the default beam for the SRS/PUCCH.

When the UE supports two active TCI states for the PDCCH, where one the two is also for the PDSCH, the UE 402 may select the active TCI state that is for both the PDCCH and the PDSCH. The UE 402 may determine the active TCI state that is for both the PDCCH and the PDSCH through selecting an active TCI state for a CORESET of the PDCCH (e.g., the active TCI state with the lowest TCI state ID), or through active TCI state information received in a MAC-CE. The UE uses the selected active TCI state for determining the default beam for SRS/PUCCH transmissions.

Figure 5:
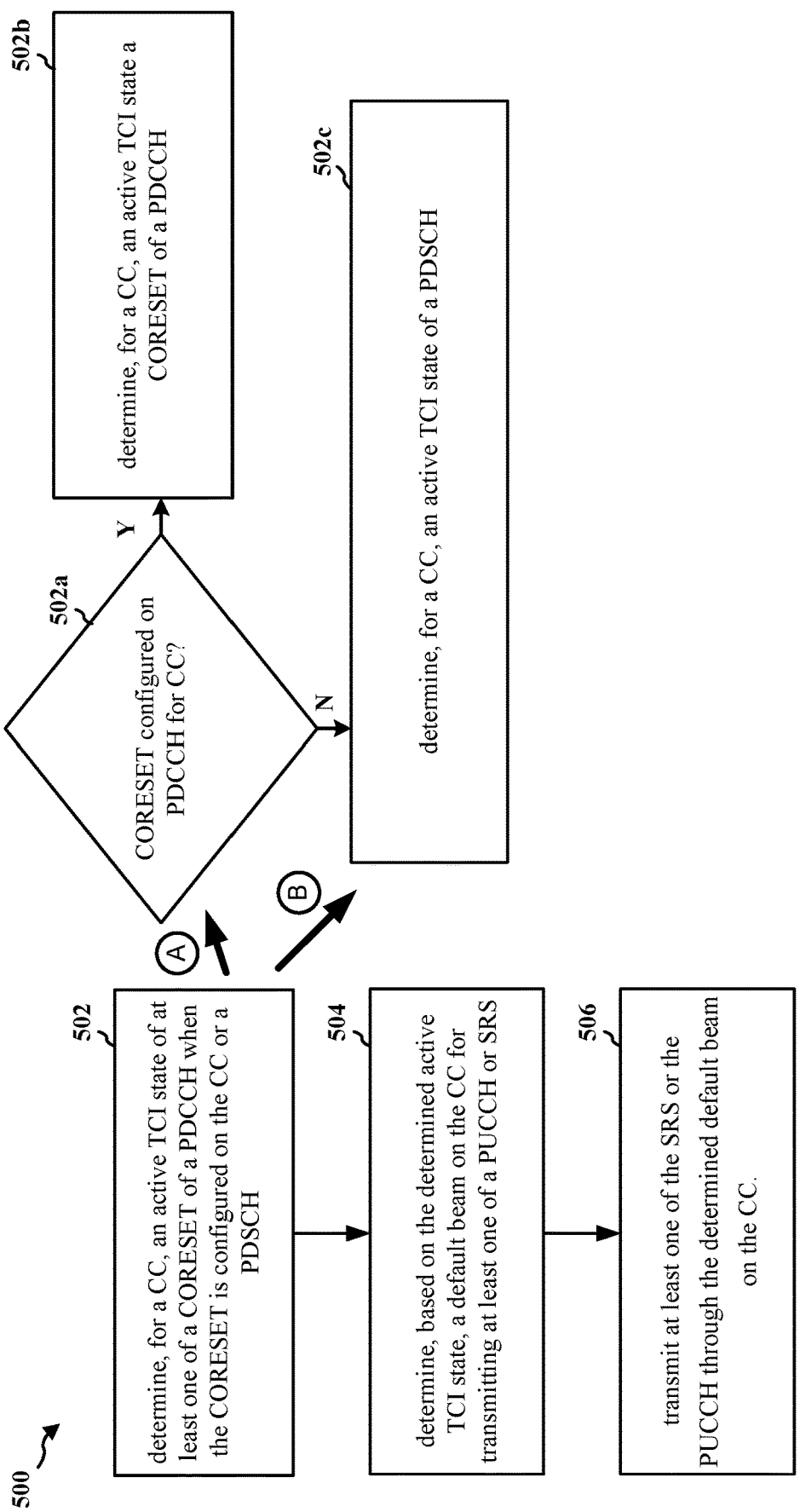
FIG. 5 is a flowchart of a method of wireless communication.

FIG. 5 is a flowchart 500 of a method of wireless communication at a UE. The method may be performed by a UE (e.g., the UE 104, 350, 402; the apparatus 602/602'; the processing system 714, which may include the memory 360 and which may be the entire UE 104, 350, 402 or a component of the UE 104, 350, 402, such as the TX processor 368, the RX processor 356, and/or the controller/processor 359). At 502, the UE determines, for a CC, an active TCI state of at least one of a CORESET of a PDCCH when the CORESET is configured on the CC or a PDSCH. Subsequently, at 504, the UE determines, based on the determined active TCI state, a default beam on the CC for transmitting at least one of a PUCCH or SRS. Subsequently, at 506, the UE transmits at least one of the PUCCH or the SRS through the determined default beam on the CC.

In one configuration, following path A, the UE may determine the active TCI state at 502 by determining whether the CORESET is configured on the CC 502a, and when the CORESET is configured on the CC, the UE may determine at 502b that the active TCI state is one active TCI state of active TCI states of the CORESET of the PDCCH. In such a configuration, at 504, the UE determines the default beam for at least one of the PUCCH or the SRS based on the determined active TCI state of the CORESET of the PDCCH. However, when the CORESET is not configured on the CC, the UE may determine at 502c that the active TCI state is one active TCI state of active TCI states of the PDSCH. In such a configuration, at 504, the UE determines the default beam for at least one of the PUCCH or the SRS based on the determined active TCI state of the PDSCH. At 502b, 502c, the UE may determine that the active TCI state of the PDSCH is the TCI state with a lowest TCI state identifier of the active TCI states of the PDSCH, or alternatively, the UE may determine the active TCI state based on an indication in a MAC-CE.

In one configuration, following path B, the UE may determine at 502c that the active TCI state is one active TCI state of active TCI states of the PDSCH. In such a configuration, at 504, the UE may determine the default beam for at least one of the PUCCH or the SRS based on the determined active TCI state of the PDSCH. At 502c, the UE may determine that the active TCI state of the PDSCH is the TCI state with a lowest TCI state identifier of the active TCI states of the PDSCH, or alternatively, the UE may determine the active TCI state based on an indication in a MAC-CE.

As discussed above, when the UE supports a first active TCI state and a second active TCI state for the PDCCH, where one of the first TCI state or the second TCI state is also for the PDSCH, the UE may determine that the active TCI state is one of the first TCI state or the second TCI state that is also for the PDSCH. In one configuration, the UE determines the active TCI state based on an active TCI state for a CORESET of the PDCCH. In another configuration, the UE determines the active TCI state based on an indication through a MAC-CE.

Figure 6:
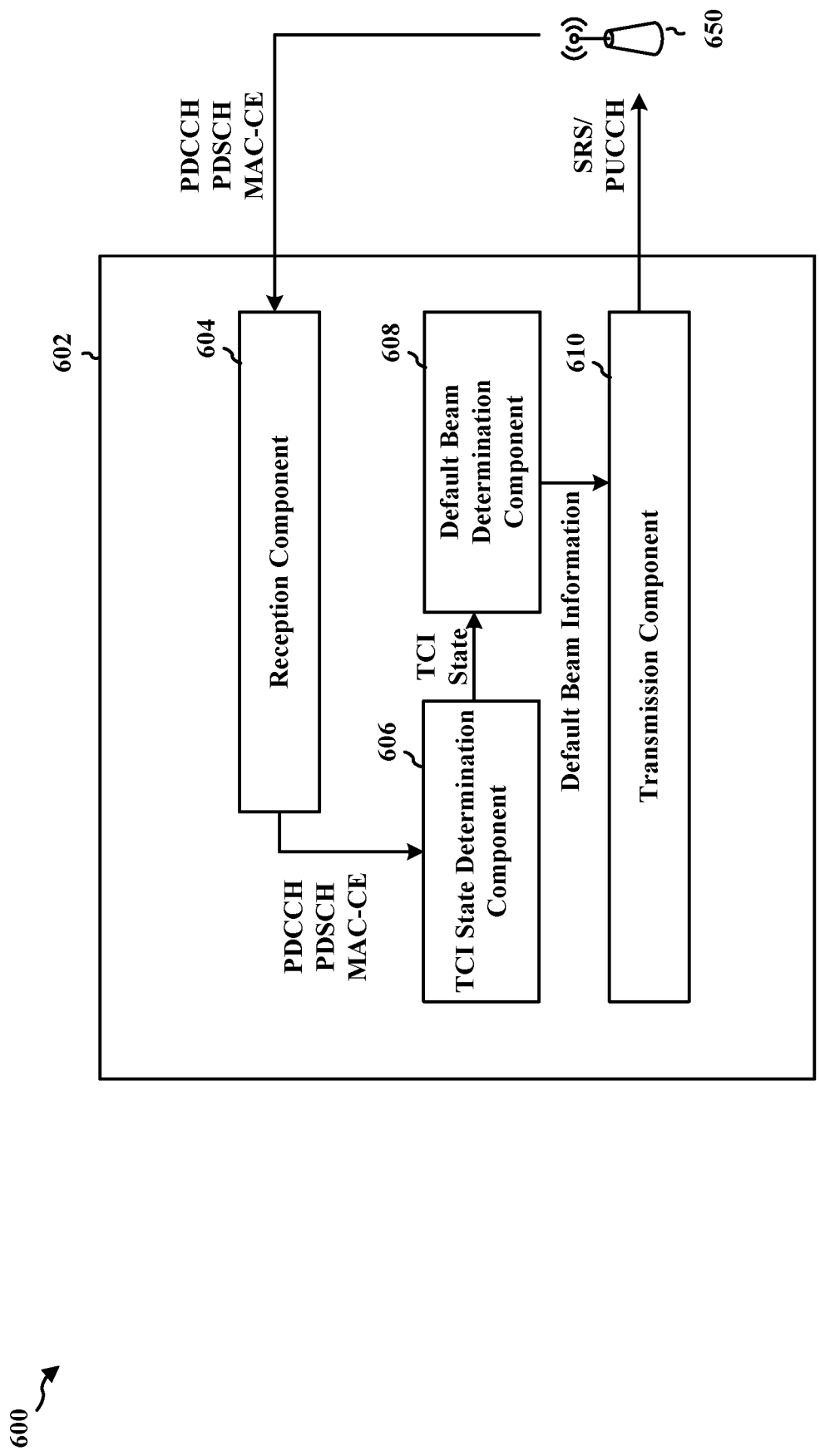
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus may be at a UE. The apparatus includes a reception component 604 that is configured to receive on DL a PDCCH, and PDSCH, including a MAC-CE within a MAC header in a PDSCH. The reception component 604 may provide the PDCCH, PDSCH, MAC-CE to a TCI state determination component 606. The TCI state determination component 606 may be configured to determine, for a CC, an active TCI state of at least one of a CORESET of a PDCCH when the CORESET is configured on the CC or a PDSCH. The TCI state determination component 606 may provide the determined active TCI state to a default beam determination component 608, which may be configured to determine, based on the determined active TCI state, a default beam on the CC for transmitting at least one of a PUCCH or SRS. The default beam determination component 608 may provide the default beam information to a transmission component 610, that is configured to transmit to a base station 650 at least one of the PUCCH or the SRS through the determined default beam on the CC.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
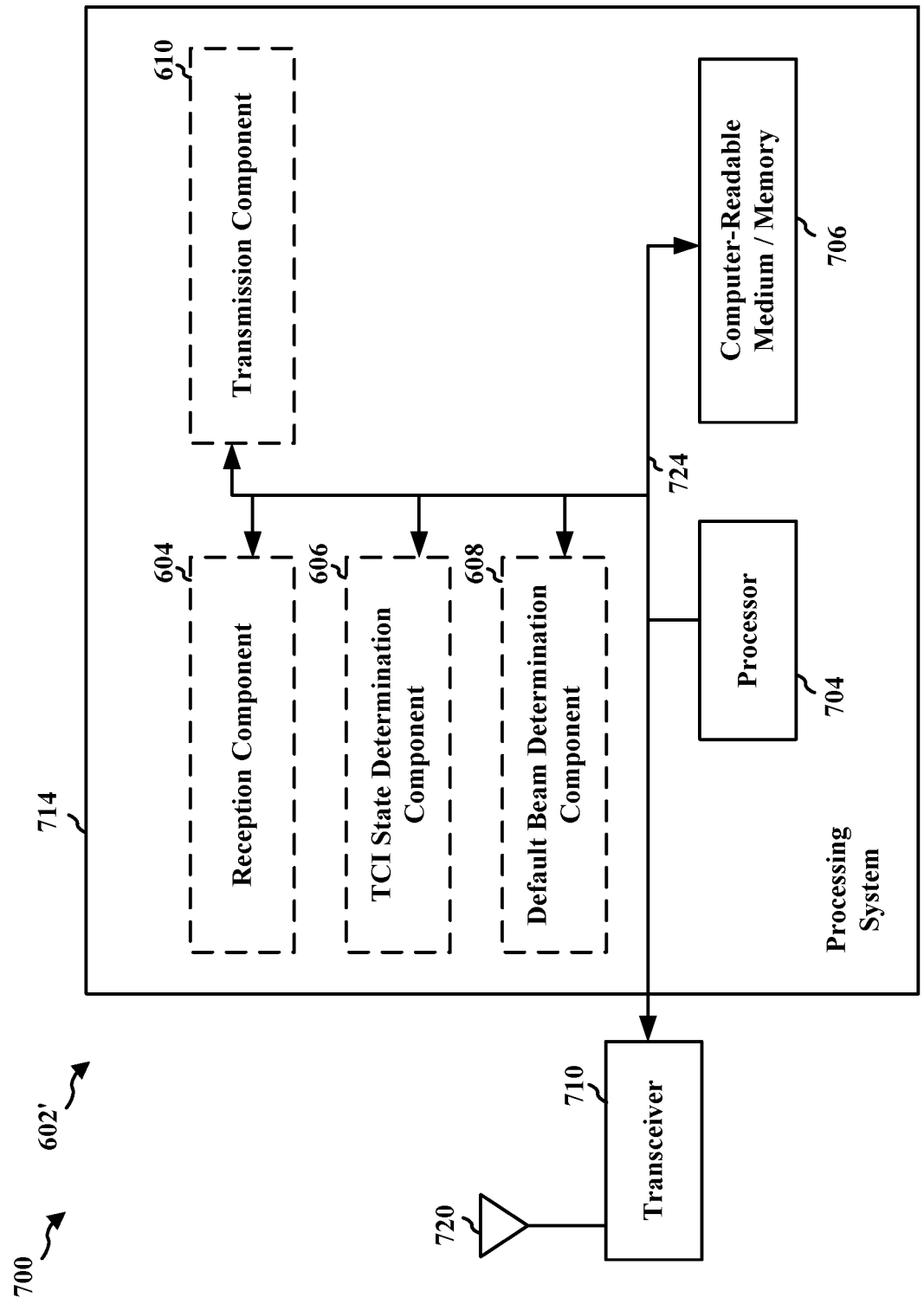
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

In one configuration, the apparatus 602/602' for wireless communication includes means for determining, for a CC, an active TCI state of at least one of a CORESET of a PDCCH when the CORESET is configured on the CC or a PDSCH. The apparatus further includes means for determining, based on the determined active TCI state, a default beam on the CC for transmitting at least one of a PUCCH or SRS. The apparatus further includes means for transmitting at least one of the PUCCH or the SRS through the determined default beam on the CC. In one configuration, the means for determining the active TCI state is configured to determine whether the CORESET is configured on the CC. In such a configuration, when the CORESET is configured on the CC, the determined active TCI state is one active TCI state of active TCI states of the CORESET of the PDCCH, and the default beam for at least one of the PUCCH or the SRS is determined based on the determined active TCI state of the CORESET of the PDCCH. Further, in such a configuration, when the CORESET is not configured on the CC, the determined active TCI state is one active TCI state of active TCI states of the PDSCH, and the default beam for at least one of the PUCCH or the SRS is determined based on the determined active TCI state of the PDSCH. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

As discussed above, a default spatial relation/beam for SRS/PUCCH is provided. A UE may determine the default spatial relation/beam based on whether a CORESET is configured for a PDCCH (see configuration 6). If a CORESET is configured for the PDCCH, the UE may determine one active TCI state associated with the CORESET, and may determine the default beam for transmitting the SRS/PUCCH based on the determined one active TCI state for the CORESET. However, if a CORESET is not configured for the PDCCH, the UE may determine one active TCI state associated with a PDSCH, and may determine the default beam for transmitting the SRS/PUCCH based on the determined one active TCI state for the PDSCH. In another configuration (see configuration 7), the UE may not determine whether a CORESET is configured for a PDCCH, and instead may determine one active TCI state associated with the PDSCH. In such a configuration, the UE may determine the default beam for transmitting the SRS/PUCCH based on the determined one active TCI state for the PDSCH. The UE may transmit SRS/PUCCH on the determined default beam.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    determining, for a component carrier (CC), an active transmission configuration indicator (TCI) state of at least one of a control resource set (CORESET) of a physical downlink control channel (PDCCH) when the CORESET is configured on the CC or a physical downlink shared channel (PDSCH);
    determining, based on the determined active TCI state, a default beam on the CC for transmitting at least one of a physical uplink control channel (PUCCH) or sounding reference signals (SRS), wherein when the CORESET is configured on the CC, the default beam for at least one of the PUCCH or the SRS is determined based on the determined active TCI state of the CORESET of the PDCCH, wherein when the CORESET is not configured on the CC, the default beam for at least one of the PUCCH or the SRS is determined based on the determined active TCI state of the PDSCH; and
    transmitting at least one of the PUCCH or the SRS through the determined default beam on the CC.

2. The method of claim 1, wherein the determining the active TCI state comprises determining whether the CORESET is configured on the CC, wherein when the CORESET is configured on the CC, the determined active TCI state is one active TCI state of active TCI states of the CORESET of the PDCCH.

3. The method of claim 2, wherein when the CORESET is not configured on the CC, the determined active TCI state is one active TCI state of active TCI states of the PDSCH.

4. The method of claim 3, wherein the determined active TCI state of the PDSCH is the TCI state with a lowest TCI state identifier of the active TCI states of the PDSCH, or the determined active TCI state is indicated by a medium access control (MAC) control element (CE).

5. The method of claim 1, wherein the determined active TCI state is one active TCI state of active TCI states of the PDSCH, and the default beam for at least one of the PUCCH or the SRS is determined based on the determined active TCI state of the PDSCH.

6. The method of claim 5, wherein the determined active TCI state of the PDSCH is the TCI state with a lowest TCI state identifier of the active TCI states of the PDSCH, or the determined active TCI state is indicated by a medium access control (MAC) control element (CE).

7. The method of claim 1, wherein the UE supports a first active TCI state and a second active TCI state for the PDCCH, where one of the first TCI state or the second TCI state is also for the PDSCH, and wherein the determined active TCI state is one of the first TCI state or the second TCI state that is also for the PDSCH.

8. The method of claim 7, wherein the UE determines the active TCI state based on an active TCI state for a CORESET of the PDCCH.

9. The method of claim 7, wherein the UE determines the active TCI state based on an indication through a medium access control (MAC) control element (CE).

10. An apparatus for wireless communication at a user equipment (UE), comprising:
a memory; and
at least one processor coupled to the memory and configured to:
determine, for a component carrier (CC), an active transmission configuration indicator (TCI) state of at least one of a control resource set (CORESET) of a physical downlink control channel (PDCCH) when the CORESET is configured on the CC or a physical downlink shared channel (PDSCH);
determine, based on the determined active TCI state, a default beam on the CC for transmitting at least one of a physical uplink control channel (PUCCH) or sounding reference signals (SRS), wherein when the CORESET is configured on the CC, the default beam for at least one of the PUCCH or the SRS is determined based on the determined active TCI state of the CORESET of the PDCCH, wherein when the CORESET is not configured on the CC, the default beam for at least one of the PUCCH or the SRS is determined based on the determined active TCI state of the PDSCH; and
transmit at least one of the PUCCH or the SRS through the determined default beam on the CC.

11. The apparatus of claim 10, wherein to determine the active TCI state, the at least one processor is configured to determine whether the CORESET is configured on the CC, wherein when the CORESET is configured on the CC, the determined active TCI state is one active TCI state of active TCI states of the CORESET of the PDCCH.

12. The apparatus of claim 11, wherein when the CORESET is not configured on the CC, the determined active TCI state is one active TCI state of active TCI states of the PDSCH.

13. The apparatus of claim 12, wherein the determined active TCI state of the PDSCH is the TCI state with a lowest TCI state identifier of the active TCI states of the PDSCH, or the determined active TCI state is indicated by a medium access control (MAC) control element (CE).

14. The apparatus of claim 10, wherein the determined active TCI state is one active TCI state of active TCI states of the PDSCH, and the default beam for at least one of the PUCCH or the SRS is determined based on the determined active TCI state of the PDSCH.

15. The apparatus of claim 14, wherein the determined active TCI state of the PDSCH is the TCI state with a lowest TCI state identifier of the active TCI states of the PDSCH, or the determined active TCI state is indicated by a medium access control (MAC) control element (CE).

16. The apparatus of claim 10, wherein the UE supports a first active TCI state and a second active TCI state for the PDCCH, where one of the first TCI state or the second TCI state is also for the PDSCH, and wherein the determined active TCI state is one of the first TCI state or the second TCI state that is also for the PDSCH.

17. The apparatus of claim 16, wherein the UE determines the active TCI state based on an active TCI state for a CORESET of the PDCCH.

18. The apparatus of claim 16, wherein the UE determines the active TCI state based on an indication through a medium access control (MAC) control element (CE).

19. An apparatus of wireless communication at a user equipment (UE), comprising:
means for determining, for a component carrier (CC), an active transmission configuration indicator (TCI) state of at least one of a control resource set (CORESET) of a physical downlink control channel (PDCCH) when the CORESET is configured on the CC or a physical downlink shared channel (PDSCH);
means for determining, based on the determined active TCI state, a default beam on the CC for transmitting at least one of a physical uplink control channel (PUCCH) or sounding reference signals (SRS), wherein when the CORESET is configured on the CC, the default beam for at least one of the PUCCH or the SRS is determined based on the determined active TCI state of the CORESET of the PDCCH, wherein when the CORESET is not configured on the CC, the default beam for at least one of the PUCCH or the SRS is determined based on the determined active TCI state of the PDSCH; and
means for transmitting at least one of the PUCCH or the SRS through the determined default beam on the CC.

20. The apparatus of claim 19, wherein the means for determining the active TCI state is configured to determine whether the CORESET is configured on the CC, wherein when the CORESET is configured on the CC, the determined active TCI state is one active TCI state of active TCI states of the CORESET of the PDCCH.

21. The apparatus of claim 20, wherein when the CORESET is not configured on the CC, the determined active TCI state is one active TCI state of active TCI states of the PDSCH.

22. The apparatus of claim 21, wherein the determined active TCI state of the PDSCH is the TCI state with a lowest TCI state identifier of the active TCI states of the PDSCH, or the determined active TCI state is indicated by a medium access control (MAC) control element (CE).

23. The apparatus of claim 19, wherein the determined active TCI state is one active TCI state of active TCI states of the PDSCH, and the default beam for at least one of the PUCCH or the SRS is determined based on the determined active TCI state of the PDSCH.

24. The apparatus of claim 23, wherein the determined active TCI state of the PDSCH is the TCI state with a lowest TCI state identifier of the active TCI states of the PDSCH, or the determined active TCI state is indicated by a medium access control (MAC) control element (CE).

25. The apparatus of claim 19, wherein the UE supports a first active TCI state and a second active TCI state for the PDCCH, where one of the first TCI state or the second TCI state is also for the PDSCH, and wherein the determined active TCI state is one of the first TCI state or the second TCI state that is also for the PDSCH.

26. The apparatus of claim 25, wherein the UE determines the active TCI state based on an active TCI state for a CORESET of the PDCCH.

27. The apparatus of claim 25, wherein the UE determines the active TCI state based on an indication through a medium access control (MAC) control element (CE).

28. A non-transitory computer-readable medium storing computer executable code at a user equipment (UE), the code when executed by a processor cause the processor to:
- determine, for a component carrier (CC), an active transmission configuration indicator (TCI) state of at least one of a control resource set (CORESET) of a physical downlink control channel (PDCCH) when the CORESET is configured on the CC or a physical downlink shared channel (PDSCH);
- determine, based on the determined active TCI state, a default beam on the CC for transmitting at least one of a physical uplink control channel (PUCCH) or sounding reference signals (SRS), wherein when the CORESET is configured on the CC, the default beam for at least one of the PUCCH or the SRS is determined based on the determined active TCI state of the CORESET of the PDCCH, wherein when the CORESET is not configured on the CC, the default beam for at least one of the PUCCH or the SRS is determined based on the determined active TCI state of the PDSCH; and
- transmit at least one of the PUCCH or the SRS through the determined default beam on the CC.

* * * * *